Dec. 18, 1934.   W. OWEN   1,984,943
GLASS CUTTING APPARATUS
Filed Oct. 6, 1933   5 Sheets-Sheet 1

INVENTOR
WILLIAM OWEN.
BY
ATTORNEYS.

Dec. 18, 1934.  W. OWEN  1,984,943

GLASS CUTTING APPARATUS

Filed Oct. 6, 1933   5 Sheets-Sheet 2

INVENTOR
WILLIAM OWEN.
BY
ATTORNEYS.

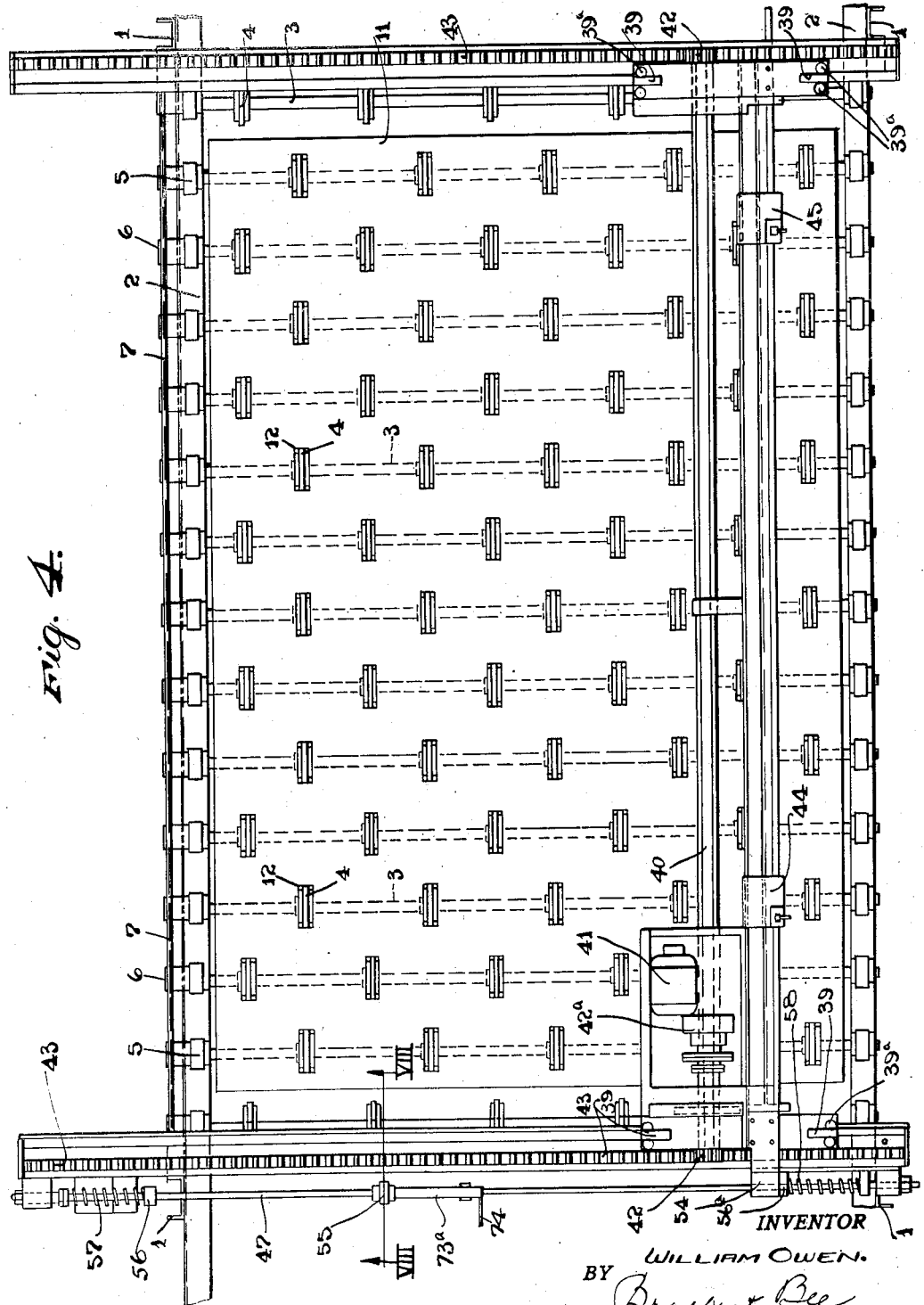

Dec. 18, 1934.                W. OWEN                1,984,943
                        GLASS CUTTING APPARATUS
                        Filed Oct. 6, 1933        5 Sheets-Sheet 4
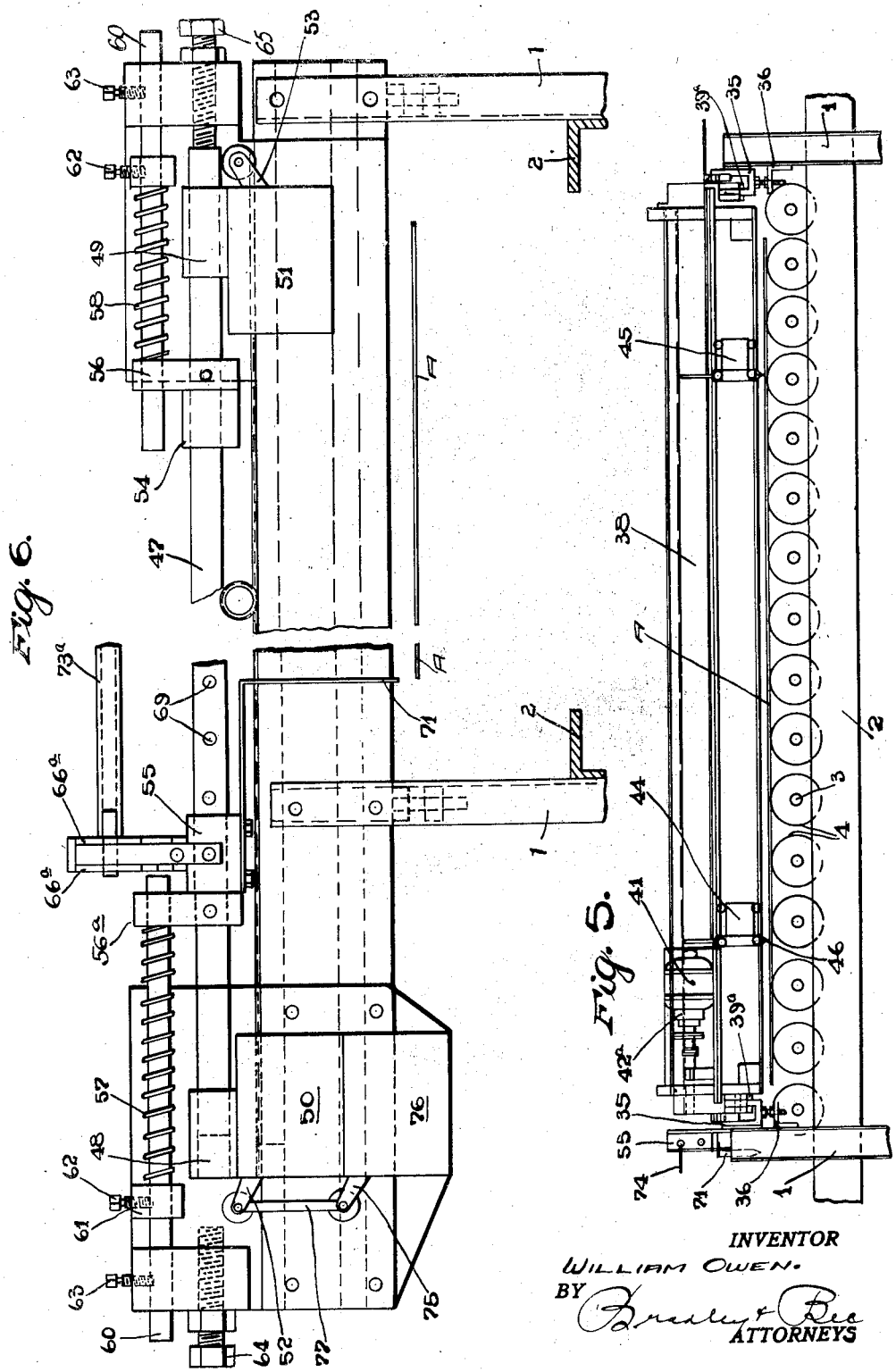
INVENTOR
WILLIAM OWEN.
BY
ATTORNEYS Dec. 18, 1934.    W. OWEN    1,984,943
GLASS CUTTING APPARATUS
Filed Oct. 6, 1933    5 Sheets-Sheet 5
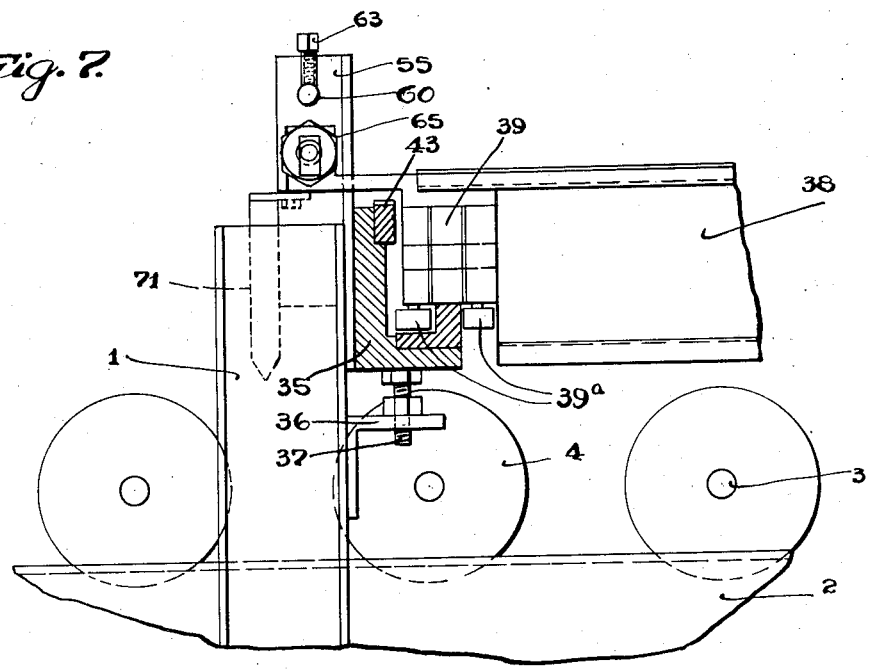
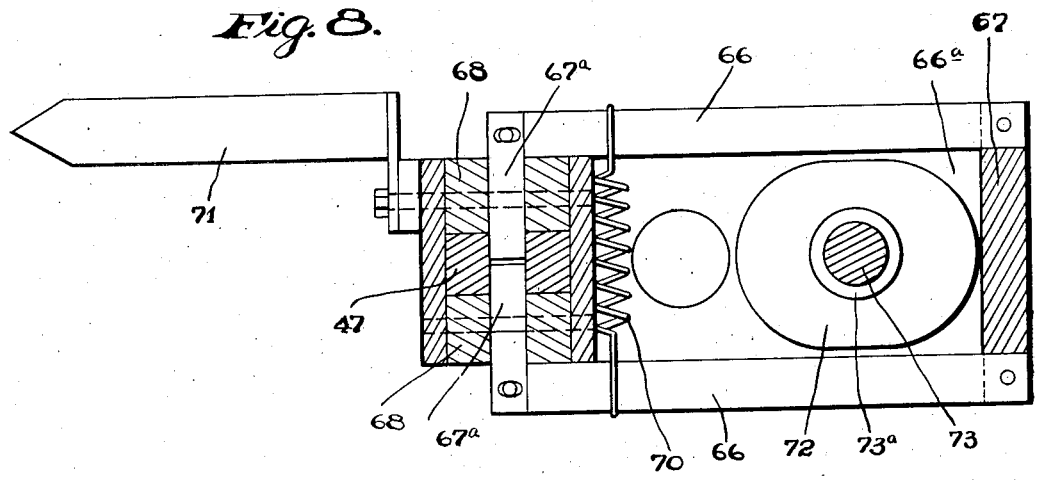
INVENTOR
WILLIAM OWEN.
BY
ATTORNEYS Patented Dec. 18, 1934

1,984,943

UNITED STATES PATENT OFFICE 1,984,943

GLASS CUTTING APPARATUS

William Owen, Pittsburgh, Pa., assignor to Pittsburgh Plate Glass Company, a corporation of Pennsylvania Application October 6, 1933, Serial No. 692,505

8 Claims. (Cl. 33—32)

Figure 1:
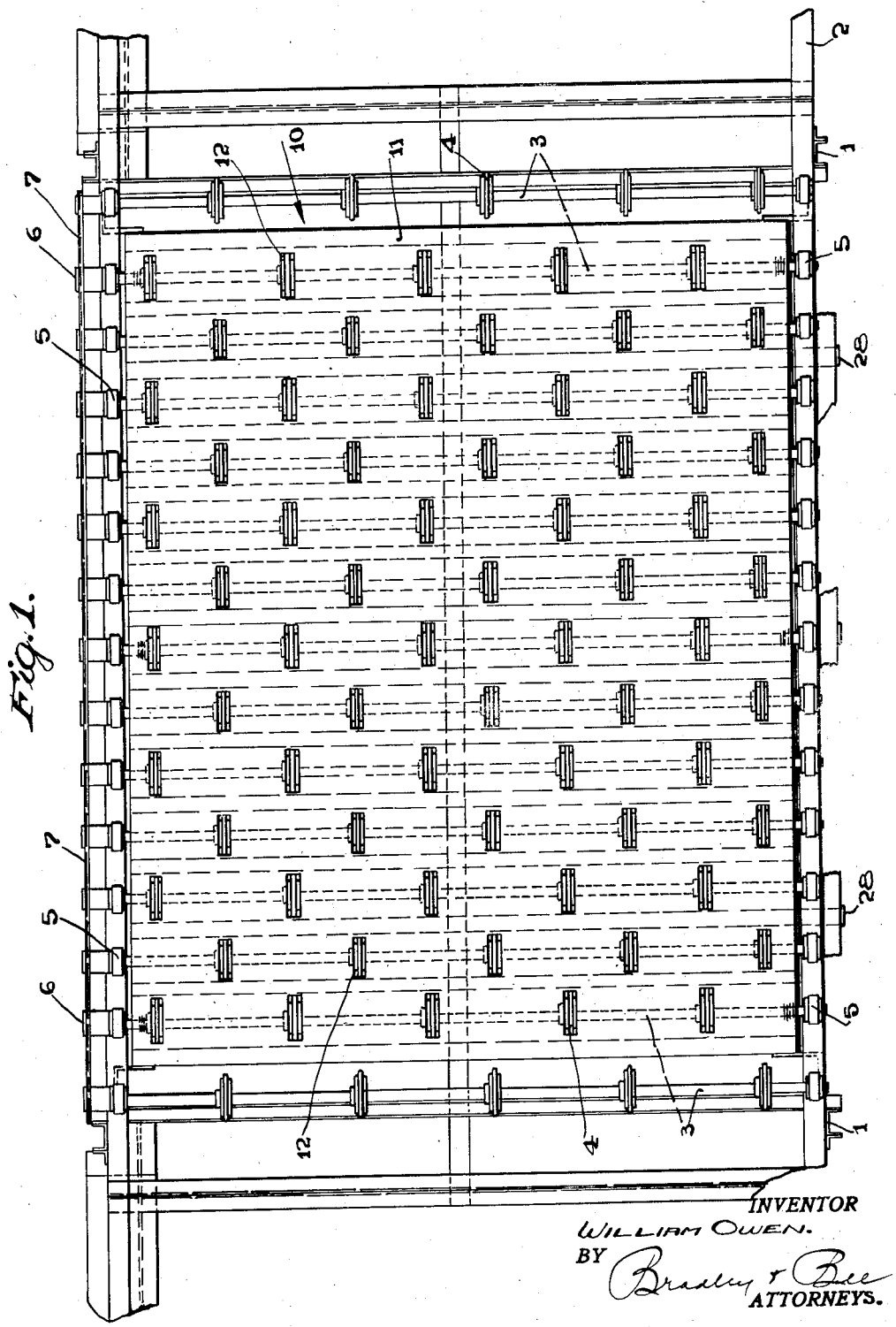
Figure 2:
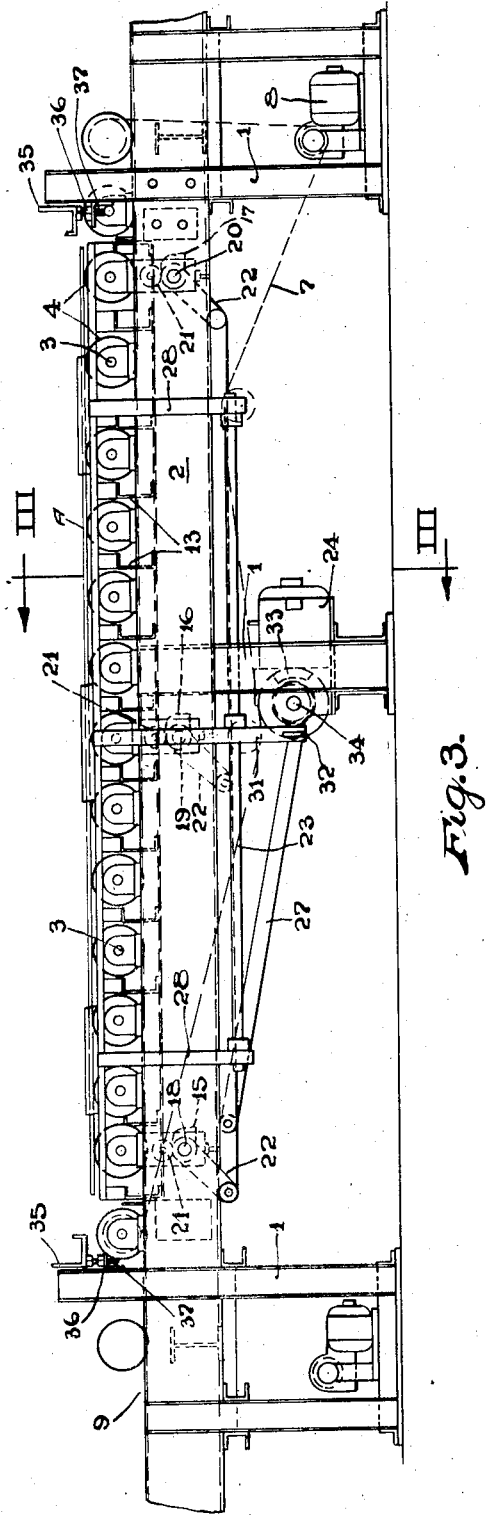
Figure 3:
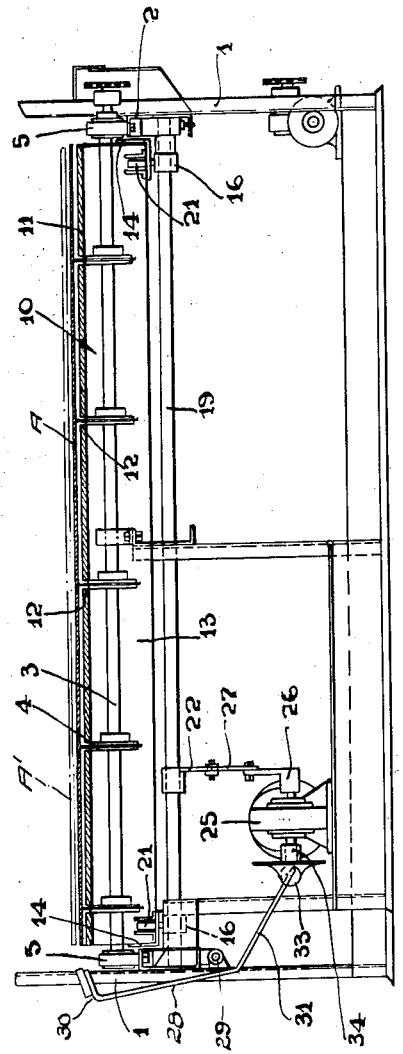

The invention relates to an apparatus for cutting glass sheets, either plate or window glass, and constitutes an improvement on the apparatus of my application, Serial No. 664,926, filed April 7, 1933. The invention has for its principal objects the provision of a cutting table which lends itself to an automatic operation, so that a minimum of labor is required, and one having improved means for supporting the glass during the scoring operation and carrying the glass onto and off of the table before and after such operation; the provision of an arrangement which permits of the successive operation of the cutters without the necessity of raising and lowering them, thus speeding up the operation and reducing the work of the operator; the provision of improved means for squaring up the sheets on the table preliminary to the cutting or scoring operation; and the provision of improved means for stopping the movement of the cutter carriage before the cutters reach the edge of the sheet, and for positioning the carriage with the cutters closely adjacent the edge of the sheet preliminary to the scoring or cutting movement of the carriage. One embodiment of the invention is shown in the accompanying drawings, wherein:

Figure 1 is a plan view of the table with the cutter carriage or bridge and stop mechanism removed. Fig. 2 is a side elevation of the table of Fig. 1. Fig. 3 is a vertical section on the line III—III of Fig. 2. Figs. 4 and 5 are partial plan and side elevation views respectively showing the cutter carriage and stop mechanism. And Figs. 6, 7 and 8 are detail views showing the stop mechanism, Fig. 6 being a side elevation, Fig. 7 an end view partially in section, and Fig. 8 an enlarged section on the line VIII—VIII of Fig. 4.

Referring first to the table or runway construction shown in Figs. 1 to 3, from which the bridge which carries the cutters is removed for clearer illustration, the supporting frame consists of the upright channels 1, 1, 1, etc. and the horizontal channels 2, 2, 2, etc., and in this frame are journalled the shafts 3, 3, 3, etc., carrying the rollers 4, 4, 4, etc., which constitute the means for forwarding the glass sheets A to be cut. The shafts are journalled in suitable bearings 5, 5, 5, etc. and provided at their ends with sprockets 6, 6, 6, etc. Around these sprockets passes a chain 7 driven intermittently, as later described, from the motor 8. Glass is supplied to the table from a roller runway 9 at the left thereof, and after the glass is scored or cut on the table, it is carried off of the table to the right and onto a runway where pressure means is applied to crack the glass into sections.

In order to lift the glass sheet A from the rollers, and support it during the scoring operation, the vertically movable table 10 is provided, such table having a top 11 with suitable slots or openings 12 therein through which the rollers project when the table is in its lower position, as shown in Fig. 3. When the top is moved to its upper position, the glass sheet is lifted from the rollers and the glass sheet lies at the position shown in dotted lines in Fig. 3 and marked A'. The table comprises the top 11 with an underframing made up of the transverse channels 13 carried by the two longitudinal angles 14, 14, and is moved up and down by the pairs of cams 15, 15, 16, 16, and 17, 17 (Fig. 2) on the transverse shafts 18, 19, and 20 which engage rollers 21 carried by the angles 14, 14. The shafts 18, 19 and 20 are rotated by the arms 22, 22, 22 pivoted at their free ends to the connecting rod 23. This connecting rod is operated from the electric motor 24 through the intermediary of reduction gearing in the casing 25, the crank 26 and the connecting rod 27. When the arms 22 are swung to the right (Fig. 2) through an angle of 90 degrees, the table is moved up lifting the glass to the position A' of Fig. 3.

In order to square the glass sheet on the table so that its edges are in parallelism with the center line of the table and to definitely position the sheet laterally on the table, the three-lever arms 28, 28, 28 are provided along one side of the channel 2 mounted on the shaft 29 and having inturned ends 30 at a proper height to engage the edge of the sheet when they are moved inward and while the glass sheet is resting on the rollers 4. The center arm 28 has an extension 31 carrying a roller 32 which is engaged by a cam 33 and this cam is rotated by the shaft 34 driven from the motor 24. The arms 28 are thus caused to move inward at each revolution of the shaft so that their ends engage the edge of the glass sheet, squaring and positioning it. The outward movement of the arms is due to gravity which holds the roller 32 in engagement with the cam wheel.

Carried above the table is the means for scoring the glass in a direction transverse of the table, such means being similar to that shown in my application heretofore referred to and is shown in Figs. 4, 5 and 6. At each end of the table is an L-shaped rail 35 supported upon the frame members 1 by angle brackets 36 and suitable leveling bolts 37. The rails serve as a track for the cutter carriage or bridge 38 which is provided at its end with rollers 39, 39a engaging the flanges of the rails. The bridge also carries a transverse shaft 40 driven from a motor 41 through the intermediary of suitable reduction gearing in the casing 42a and provided with pinions 42 engaging racks 43 carried by the vertical flanges of the rails 35. Power means are thus provided for moving the bridge back and forth across the table to accomplish the function of scoring the glass after it is properly positioned on the table top. Mounted on the bridge for adjustment therealong are a plurality of cutter heads 44, 45, etc., only two of which are shown. These heads are each provided with a cutter 46, such as a wheel or diamond, and preferably duplicate the construction shown and illustrated in my application. The cutters may be raised and lowered in the heads so as to either engage or clear the glass, but the apparatus may be operated without this movement because of the provision in the present construction for raising and lowering the table top 11. When the table top is in its upper position carrying the glass at the position A' of Fig. 3, the cutters engage the sheet permitting a cut to be made. After the cut is made and the table top is moved down so that the glass rests on the rollers (Fig. 5), the upper surface of the glass sheet is below the lowest level of the cutters, so that the cutter heads may be moved back to starting position without raising the cutters. This simplifies the operation of the apparatus since with certain classes of work the operator is relieved of the duty of raising or cancelling the cutters in the heads after each operation, and then resetting them after the bridge has been moved back to starting position. If desired, the back and forth movements of the bridge may be made automatic and synchronized with the movements of the table and the squaring devices, so that these devices operate in the sequence above described. In such operation, the glass sheet is brought over the table top with the bridge at one end of the tracks 35 ready to start a cut, and the squaring devices move in to position the sheet, after which the table moves up lifting the glass into contact with the cutters, and the bridge then starts along its track to make the cut. When the cut is completed, the table moves down and a second sheet of glass is run onto the rollers while the scored sheet moves off of the rollers. While this shift is in progress, the bridge moves back to starting position and the cycle repeated indefinitely with little attention required on the part of the operator if the cutting of all the sheets is the same so that resetting of the cutter heads along the bridge is not necessary.

The apparatus is preferably provided with means for automatically governing the stopping and starting positions of the bridge with exactness, so that in both starting and stopping positions the cutters are just short of the edges of the sheet. This expedient saves time for the operator, and avoids any injury to the cutters, such as may occur when a cutter is brought against the edge of a sheet in starting the cut or runs over the edge of a sheet and strikes the table beneath at the end of a cut. This detail of construction will be seen by reference to Figs. 6 to 8. As here shown, 47 is a bar mounted for sliding endwise movement in a pair of guides 48 and 49 secured to the fixed frame of the machine to which frame is also fixed the limit switches 50 and 51 having arms 52 and 53 provided with rollers in position to be engaged by the ends of the bar 47, the actuation of the limit switches serving to cut off the supply of current to the motor 41 which moves the bridge. The bar 47 is given its endwise movement when the bridge approaches the end of its cutting movement by the lug 54 secured to the bridge and slidable on the bar. A pair of stops 55 and 56 are secured to the bar 47, and when the lug 54 engages one of these stops, the bar is given an endwise movement and operates one of the limit switches. In order to slow down the movement of the bridge at the end of its movement and to cushion it, the springs 57 and 58 are provided on the rods 59 and 60 in the line of movement of the stops 56 and 56a, the rods and springs being adjustable by means of the collars 61 and set screws 62 and 63. In order to positively stop the movement of the bridge in exact positions, the adjustable stop bolts 64 and 65 are employed in alignment with the ends of the bar 47.

The stop 56 is engaged by the lug 54 when the bridge approaches the end of its travel to the right (Fig. 6), and on the reverse movement provision is made for an adjustment by the use of the stop member 55 which is adjustable longitudinally of the bar 47 and is engaged by the lug 54 as the bridge approaches the end of its travel to the left. The member 55 comprises two side bars 66, 66 (Fig. 8) pivoted to the top plate 67 and carrying at their lower ends the pins 67a, 67a guided in the block 68 and adapted to engage the perforations 69 in the bar 47, the side bars being pulled toward each other by a spring 70. A pointer 71 extends down from the block 68 to a position just over the glass, thus facilitating the adjusting of the member 55 with respect to the glass sheet. The side bars 66, 66 are separated by a cam 72 on a stub shaft 73, and such shaft is journalled in the end plates 66, 66 of the box-like member 55. The shaft is rotated by a pipe 73a having a handle 74. The pipe 73a is of such length that it brings the operating handle 74 relatively close to the side of the machine on which the operator stands, so that such handle can easily be reached when the member 55 is adjusted to a position quite remote from such side, as illustrated in Fig. 4.

As shown in Fig. 6, the arm 52 of the limit switch 50 is connected to the arm 75 of a limit switch 76 by a link 77, which latter switch governs the starting of the motor 24 which raises the table top, so that the table top is raised to lift the glass sheet thereon to engage the cutters when the bridge is returned to starting position preliminary to a new cut.

What I claim is:

1. In combination in glass cutting apparatus, a fixed supporting frame, a series of rollers extending along the length of the frame journalled therein and constituting a roller runway for a glass sheet, means for driving the rollers, a table top supported on the frame for vertical movement and having openings through which the peripheries of the rollers project when the table top is in its lower position, means for raising and lowering the table top so that in one position the upper face of the top lies above the peripheries of the rollers thereby raising the glass sheet from the rollers and in the other position lies below such peripheries thereby lowering the glass sheet upon the rollers, tracks at the opposite edges of the table top, a bridge mounted on the track for movement therealong, and cutting means on the bridge adjustable therealong and adapted to score a glass sheet supported on said table top when the table is in its upper position.

2. In combination in glass cutting apparatus, a fixed supporting frame, a series of rollers extending along the length of the frame journalled therein and constituting a roller runway for a glass sheet, means for driving the rollers, a table top supported on the frame for vertical movement and having openings through which the peripheries of the rollers project when the table top is in its lower position, means for raising and lowering the table top so that in one position the upper face of the top lies above the peripheries of the rollers thereby raising the glass sheet from the rollers and in the other position lies below such peripheries thereby lowering the glass sheet upon the rollers, tracks at the opposite edges of the table top, a bridge mounted on the tracks for movement therealong, and cutting means on the bridge adjustable therealong, and adapted to score a glass sheet supported on said table top when the table is in its upper position, but having a downward limit of movement which prevents their engagement with the glass sheet when such sheet is in its lower position supported on the rollers.

3. In combination in glass cutting apparatus, a fixed supporting frame, a series of rollers extending along the length of the frame journalled therein and constituting a roller runway for a glass sheet, means for driving the rollers, a table top supported on the frame for vertical movement and having openings through which the peripheries of the rollers project when the table top is in its lower position, means for raising and lowering the table top so that in one position the upper face of the top lies above the peripheries of the rollers thereby raising the glass sheet from the rollers and in the other position lies below such peripheries thereby lowering the glass sheet upon the rollers, tracks at the opposite end edges of the table top extending longitudinally of the rollers, a bridge mounted on the track for movement therealong and cutting means on the bridge adjustable therealong and adapted to score a glass sheet supported on said table top when the table is in its upper position.

4. In combination in glass cutting apparatus, a fixed supporting frame, a series of rollers extending along the length of the frame journalled therein and constituting a roller runway for a glass sheet, means for driving the rollers, a table top supported on the frame for vertical movement and having openings through which the peripheries of the rollers project when the table top is in its lower position, means for raising and lowering the table top so that in one position the upper face of the top lies above the peripheries of the rollers thereby raising the glass sheet from the rollers and in the other position lies below such peripheries thereby lowering the glass sheet upon the rollers, squaring means along one edge of the table top mounted for movement toward and from the center line of the table top and adapted when moved inward to engage the edge of a glass sheet lying over the top and to square and position such sheet, means for moving the squaring means, tracks at the opposite edges of the table top, a bridge mounted on the tracks for movement therealong, and cutting means on the bridge adjustable therealong and adapted to score the glass sheet when the table is in its upper position.

5. In combination in glass cutting apparatus, a fixed supporting frame, a series of rollers extending along the length of the frame journalled therein and constituting a roller runway for a glass sheet, means for driving the rollers, a table top supported on the frame for vertical movement and having openings through which the peripheries of the rollers project and support the glass sheet when the table top is in its lower position, squaring means along one edge of the table top mounted for movement toward and from the center line of such top and adapted to engage the edge of a glass sheet lying over the top and to square and position such sheet, means for raising and lowering the table top and for moving the squaring means in timed relation so that the squaring means engages the edge of the glass sheet when the table top is in lowered position and the glass sheet is supported on the rollers, tracks at the opposite edges of the table, a bridge adjustable therealong and cutting means on the bridge adjustable therealong, and adapted to score the sheet when the table is in its upper position, the vertical movement of the table top being such that when it is in raised position its upper face lies above the peripheries of the rollers.

6. In combination in glass cutting apparatus, a fixed supporting frame, a series of rollers extending along the length of the frame journalled therein and constituting a roller runway for a glass sheet, a table top supported on the frame for vertical movement and having openings through which the rollers project and support the glass sheet when the table top is in its lower position, squaring means along one edge of the table top mounted for movement toward the center line of said top and adapted to engage the edge of a glass sheet lying over said top and to square and position such sheet, means for raising and lowering the table top and for moving the squaring means in timed relation so that the squaring means engages the edge of the glass sheet when the table top is in lowered position and the glass sheet is supported on the rollers, means for intermittently driving the rollers in timed relation with respect to the movements of the table top and squaring means, tracks at the opposite edges of the table, a bridge mounted on the tracks for movement therealong, and cutting means on the bridge adjustable therealong and adapted to score the sheet when the table top is in its upper position, the vertical movement of the table top being such that when it is in raised position its upper face lies above the peripheries of the rollers.

7. In combination in glass cutting apparatus, a runway having means for carrying a glass sheet to be cut therealong, tracks at the opposite edges of the runway, a bridge mounted on the track for movement therealong, cutting means on the bridge adjustable therealong, an electric motor carried by the bridge for moving it along the tracks, a bar extending longitudinally of one of the tracks mounted for sliding endwise movement, yielding means for holding the bar against endwise movement in either direction, limit switches adapted to be operated by the endwise movement of the bar and to cut off the supply of current to said motor, a pair of stop means carried by the bar, and means on the bridge for engaging one of said stop means when the bridge approaches the end of its travel in either direction.

8. In combination in glass cutting apparatus, a runway having means for carrying a glass sheet to be cut therealong, tracks at the opposite edges of the runway, a bridge mounted on the track for movement therealong, cutting means on the bridge adjustable therealong, an electric motor carried by the bridge for moving it along the tracks, a bar extending longitudinally of one of the tracks mounted for sliding endwise movement, yielding means for holding the bar against endwise movement in either direction, limit switches adapted to be operated by the endwise movement of the bar and to cut off the supply of current to said motor, a pair of stop means carried by the bar, one of which is adjustable longitudinally of the bar, means on the bridge for engaging one of said stop means when the bridge approaches the end of its travel in either direction, and positive stop means at each end of the bar for limiting the movement of the bar and the bridge in both directions after the operation of the limit switches.

WILLIAM OWEN.